Patented Oct. 17, 1944

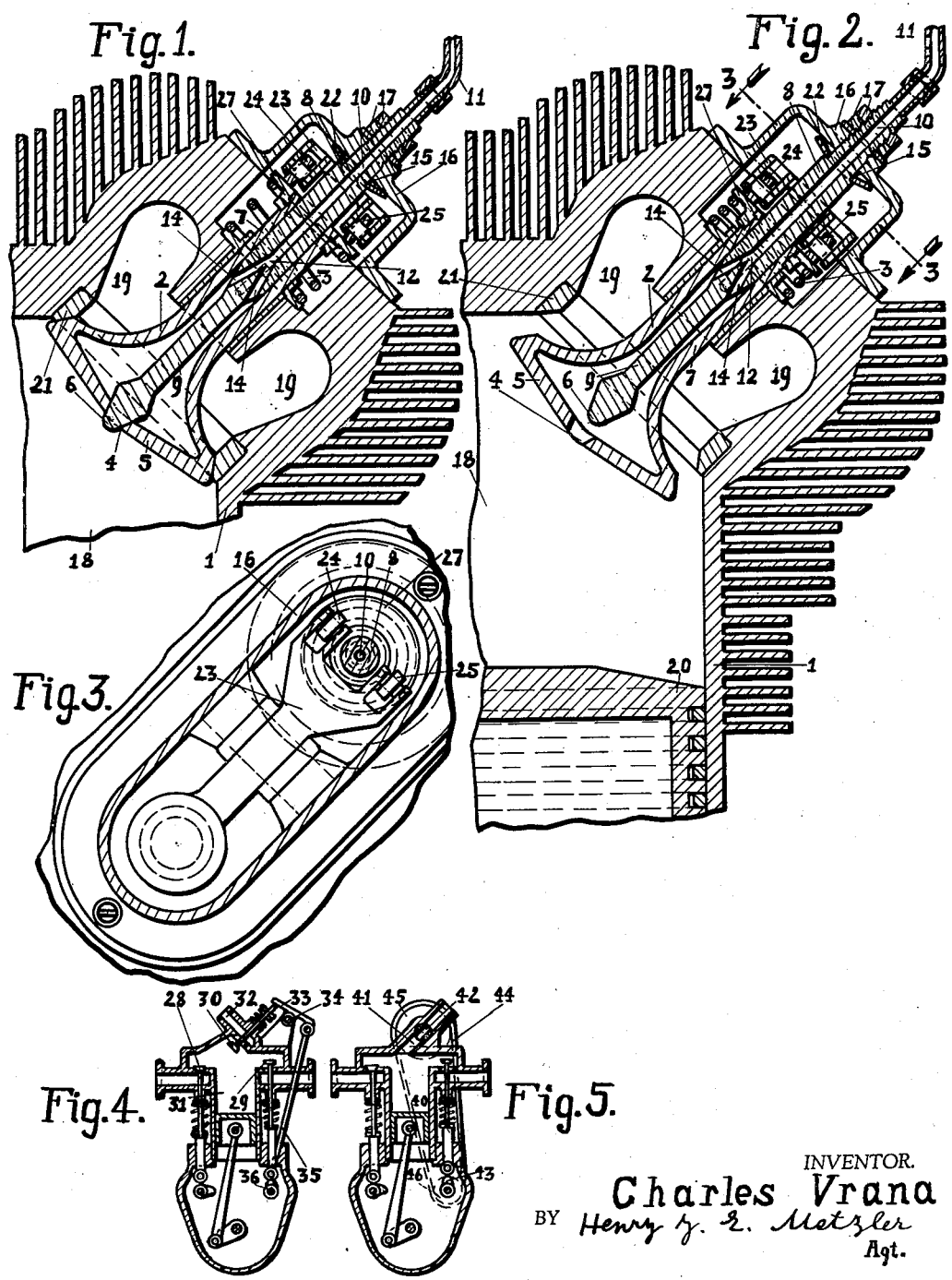

2,360,600

UNITED STATES PATENT OFFICE 2,360,600

INTERNAL-COMBUSTION ENGINE

Charles Vrana, Garfield, N. J.

Application August 28, 1943, Serial No. 500,306

2 Claims. (Cl. 123—76)

The present invention relates to improvements in internal combustion engines, and particularly to such engines of the four stroke cycle type. It is well known that the thermal efficiency of any internal combustion engine is impaired and retarded in several ways by the dead, hot, non-combustible exhaust fumes which are left in the combustion chamber after the exhaust stroke has been completed and which are mixed with the fresh gas-air mixture during the intake stroke.

Allowing these hot, non-combustible exhaust fumes to remain in the cylinders, not only tends to pack up excess carbon deposits which are a serious menace to the efficiency of the engine and which have to be removed periodically, but also tends to overheat the engine because these dead, hot fumes can do nothing else but add heat to the engine.

Furthermore, these non-combustible exhaust fumes, instead of being at least a neutral elemental agent in the live combustible fuel mixture which is to deliver the power, are actually a detrimental agent and retard the fire power of the combustible fuel mixture to the percent of their content therein.

The dead heat which remains in the cylinder mixed with the hot sometimes glowing carbon particles also has a tendency to pre-ignite the fuel mixture as the compression stroke comes up; therefore the compressing ratio must be kept low enough to avoid pre-ignition. Consequently, the loosely compressed fuel mixture explodes with a lesser force, thereby delivering less horse power than the fuel mixture is potentially capable of doing.

Elimination of this dead heat and of the hot, sometimes glowing, carbon particles will enable the compression ratio to be greatly increased thereby greatly increasing the horse power with the same amount of fuel. If this dead heat and the carbon are eliminated, a lower octane gas may be used for a higher compression ratio. Moreover, the absence of these hot, non-combustible exhaust fumes in the combustion chamber also allows the compressed fuel mixture to explode with a greater force of its own merit, yet added to this is the percent value of H. P. of the increased explosive power of the fuel mixture derived from the absence of the detrimental and retarding element of the exhaust fumes.

Hitherto, when the engine overheats, especially in hot weather, it has been the general practice to enrich the fuel air mixture. This results in two distinct losses: First, more fuel is used, causing the engine operation to cost more; second, there is an actual loss of power in using a richer mixture.

Furthermore, when an air-cooled airplane engine, or even a liquid-cooled engine is operating at full power for a take-off, the air-flow around the cylinders (or through the radiator) is slow due to the low speed of the plane, and the engine has a tendency to overheat. The normal practice then has been to enrich the fuel mixture in order to maintain the high R. P. M. to get the plane off the ground; this results in an abnormal and excessive strain on the engine as a whole.

The main object of my invention, therefore, is to provide an internal combustion engine with means for forcing fresh air into the cylinder during the exhaust stroke in such a manner that all the dead, hot, non-combustible exhaust fumes left in the combustion chamber will be expelled before the intake stroke begins. By this, all the previously mentioned disadvantages will be eliminated, the efficiency of the engine will be increased, the reduction of carbon to a minimum within the combustion chamber will avoid backfiring and "knocking" and will reduce wear and tear, and a cooler engine will be operated with a cleaner fuel-air mixture. Moreover, the acceleration will be increased because clean fresh gas burns faster than fresh gas which has been depleted by non-combustible fluid, the idling engine will not stall if it is operated with a normal (not rich) fuel-air mixture, and a cheaper or lower grade of fuel can be used for purposes which hitherto have required expensive, hundred octane gas.

Another object of my invention is the provision of an exhaust valve arrangement which allows the admission of fresh, compressed air into the combustion chamber during the exhaust stroke without increasing the number of movable parts, and which affords an excellent cooling of the head of the exhaust valve thus making it unnecessary to fill the exhaust valves with a sodium mercury eutectoid, which hitherto has been employed for carrying heat from the valve-head to the valve stem. Still another object of my invention is to provide for an intensive cooling of the interior of the cylinder head during each exhaust stroke, thus reducing the size, cost, and weight of the exterior cooling system of the engine.

Further objects of the instant invention reside in any novel feature of construction or operation or novel combination of parts present in the embodiment of the invention described and shown in the accompanying drawing whether within or without the scope of the appended claims and irrespective of other specific statements as to the scope of the invention contained herein.

In the drawing:

Figure 1 is a vertical sectional view through a preferred embodiment of my invention, showing the exhaust valve in a closed position;

Fig. 2 is a vertical sectional view through a part of an internal combustion engine (partially broken away) showing the exhaust valve of Fig. 1 in an open position;

Fig. 3 is a cross section on the line 3—3 of Fig. 2;

Fig. 4 is a diagrammatic sectional view of an internal combustion engine, illustrating a modification of my invention; and Fig. 5 is a diagrammatic sectional view of an internal combustion engine, illustrating another modification of my invention.

Similar numerals refer to similar parts throughout the several views.

Referring first to Figs. 1 to 3 inclusive, the numeral 1 denotes the upper part of a cylinder of an air-cooled four-cycle internal combustion engine having a hollow exhaust valve 2 of the drop valve type angularly inclined arranged in the cylinder head and biased into a closed position (Fig. 1) by means of a spring 3, as is customary with ordinary internal combustion engines. A conical aperture 4 is centrally located in the head 5 of valve 2, and a stationary stem having a taper end portion 6, adapted to fit tightly into aperture 4, extends through the hollow shaft 7 and head 5 of valve 2. The rear portion 8 of said stationary stem fits tightly into the hollow valve shaft 7, whereas its front portion 9 is of a smaller diameter than the rear portion 8, thus leaving a circular empty space between said portion 9 and the inner side of the lower portion of the valve shaft 7. A channel 10 is extended through said rear portion 8 and is connected to a source of compressed air (not shown) by means of an air conduit 11, as may be seen in Figs. 1 and 2. I prefer to subdivide the channel 10 at 12 into several smaller channels 14, which radiate into the space between said front portion 9 of the stationary stem and the hollow valve shaft 7, previously referred to. The rear portion 8 of said stationary stem is offset at 15 and is secured to a stationary part 16, through which it extends, by means of nuts 17 or in any other suitable manner. Said stationary stem is of such a length that its taper end portion 6 fills the aperture 4 and closes the same when the valve 2 is closed as shown in Fig. 1. When valve 2 is open (Fig. 2), the aperture 4 is in spaced relation to the taper end portion 6 so that the compressed air emanating from the channels 14 can pass through the aperture 4 into the combustion chamber 18, thus forcing all the combusted exhaust fumes out of the combustion chamber 18 through the open exhaust outlets 19. Thus when the piston 20 (partially shown in Fig. 2) begins the intake stroke, the combustion chamber 18 will be free from all non-combustible exhaust fumes, and the compressed fresh air entering during the exhaust stroke will cool the combustion chamber, particularly the cylinder head, and the exhaust valve as well.

In order to avoid that the end portion 6 of the stationary stem presses too hard against the valve head 5 when valve 2 is closed or that it prevents the valve 2 from coming in completely close contact with the valve seat 21, I prefer to insert a resilient washer 22 between the offset portion 15 of portion 8 and the stationary part 16, as may be seen in Figs. 1 and 2.

Since, in the instance shown in Figs. 1 to 3 inclusive, the rear portion 8 extends through the center of valve 2, I prefer to provide the rocker arm 23, which actuates the valve 2, with two rollers 24 and 25 each of which engages the disk 27 which is secured to the upper end of the valve shaft 7.

According to the modification shown in Fig. 4, the intake valve 28 and the exhaust valve 29 are vertically arranged and an additional intake valve 30 is angularly arranged in the head of the cylinder 31. Valve 30 is connected to a source of compressed air (not shown) by means of a pipe 32 or the like, and is actuated by rocker arm 33 which can be tilted around a pivot 34. A rod 35 adapted to be oscillated by the rotation of the exhaust valve cam shaft 36 is arranged in such a manner that it will cause an opening of valve 30 whenever the exhaust valve 29 is open.

According to the modification shown in Fig. 5, the head of the cylinder 40 is provided with an angularly inclined additional intake 41, which is connected to a source of compressed air (not shown) and which is controlled by a rotating valve 42. This rotating valve 42 will admit compressed air into the cylinder 40 twice during each revolution and it is connected to any suitable rotating part of the engine by means of a chain or gearing or the like; in the instance shown, valve 42 is connected to the exhaust valve cam shaft 43 by means of a chain 44 passing round sprocket wheels 45 and 46, the wheel 45 being twice the diameter of that of wheel 46 so that valve 42 revolves with half of the speed of that of the exhaust valve cam shaft 43.

Further modifications will be apparent to those skilled in the art and it is desired, therefore, that my invention be limited only by the prior art and the scope of the appended claims.

Having thus described my invention, what I claim and desire to secure by Letters Patent in the United States is:

1. The combination, in a four-cycle internal combustion engine having drop valves which are angularly inclined in the cylinder head, of a hollow exhaust valve having a centrally located conical aperture in its head, with a stationary stem extended through the hollow shaft of said exhaust valve and having a taper front end portion which fits into the conical aperture of said exhaust valve head and which is adapted to close said conical aperture when said exhaust valve is closed, and a source of compressed air connected to said stationary stem; the rear portion of said stem fitting tightly into the hollow shaft of said exhaust valve and being provided with a channel connected to said source of compressed air, whereas the diameter of the front portion of said stem is smaller than the inner diameter of the hollow shaft of said exhaust valve, said channel being adapted to admit compressed air into that part of said hollow exhaust valve through which the thinner front portion of said stem extends, substantially as described.

2. An engine valve having a hollow shaft adapted to be reciprocated; a hollow valve head carried by said shaft and having a centrally located conical aperture; a stationary stem of different diameters extended through said hollow shaft and having a taper front end portion adapted to close the conical aperture in said valve head when said valve is closed, the rear portion of said stationary stem fitting tightly into said hollow shaft whereas the diameter of that portion of said stationary stem which is between said rear portion and said taper front end portion is smaller than the inner diameter of said hollow valve shaft, an air channel being extended through said rear portion and being connected to a source of compressed air; a disk secured to the upper end of said valve shaft; a spring arranged below said disk and adapted to act upon its lower side; and a bifurcated arm adapted to engage the upper side of said disk; all substantially as described.

CHARLES VRANA.